US012146472B2

(12) United States Patent
Normann

(10) Patent No.: US 12,146,472 B2
(45) Date of Patent: Nov. 19, 2024

(54) HIGH VOLTAGE OFFSHORE POWER PLANT POWER DISTRIBUTION ASSEMBLY

(71) Applicant: Aker Solutions AS, Lysaker (NO)

(72) Inventor: Truls Normann, Oslo (NO)

(73) Assignee: Aker Solutions AS, Lysaker (NO)

( * ) Notice: Subject to any disclaimer, the term of this patent is extended or adjusted under 35 U.S.C. 154(b) by 0 days.

(21) Appl. No.: 18/278,562

(22) PCT Filed: Mar. 10, 2022

(86) PCT No.: PCT/EP2022/056184
§ 371 (c)(1),
(2) Date: Aug. 23, 2023

(87) PCT Pub. No.: WO2022/194667
PCT Pub. Date: Sep. 22, 2022

(65) Prior Publication Data
US 2024/0052806 A1    Feb. 15, 2024

(30) Foreign Application Priority Data

Mar. 17, 2021   (NO) .................................. 20210340

(51) Int. Cl.
F03D 9/25   (2016.01)
H02J 3/36   (2006.01)
H02J 3/38   (2006.01)

(52) U.S. Cl.
CPC ............... *F03D 9/257* (2017.02); *H02J 3/36* (2013.01); *H02J 3/381* (2013.01); *H02J 2300/28* (2020.01)

(58) Field of Classification Search
CPC .............. F03D 9/257; H02J 3/381; H02J 3/36
See application file for complete search history.

(56) References Cited

U.S. PATENT DOCUMENTS

2014/0092650 A1*   4/2014   Alston ................. H02J 3/381
363/35

FOREIGN PATENT DOCUMENTS

EP          2713468 A1      4/2014
KR     20200122545 A     10/2020
(Continued)

OTHER PUBLICATIONS

Patent Cooperation Treaty, International Application No. PCT/2022/056184, International Search Report dated Jul. 7, 2022, 4 pages.

*Primary Examiner* — Sean Gugger
(74) *Attorney, Agent, or Firm* — Bradley Arant Boult Cummings LLP

(57) ABSTRACT

A high voltage offshore power plant power distribution assembly (100) comprising, at a subsea location, two end transformers (10a) and one or more intermediate transformers (10b), wherein the respective end transformers and intermediate transformers comprise a housing (11), a transformer core and winding assembly (13) comprising a plurality of sets of utility windings (15) and a set of collection windings (17), a plurality of utility terminals (19) connected to utility windings, wherein at least some of the utility terminals are connected to offshore power providers (1, 3). A collection line (28) connects to the set of collection windings (17). The respective end transformers and one or more intermediate transformers further comprise two collection terminals (29) and a collection line branching (27) located inside the housing (11). The collection line branching (27) connects the two collection terminals (29) to the collection line (28).

13 Claims, 3 Drawing Sheets

(56) References Cited

FOREIGN PATENT DOCUMENTS

| WO | WO-2019120399 A1 | 6/2019 |
| WO | WO-2020143622 A1 | 7/2020 |

\* cited by examiner

HIGH VOLTAGE OFFSHORE POWER PLANT POWER DISTRIBUTION ASSEMBLY

TECHNICAL FIELD

The present invention relates to an offshore, electric power distribution assembly for distributing electric power from offshore power generation units, typically wind turbines or floating solar farms (PV plants).

BACKGROUND ART

Subsea transformers have been known for a long time. They have been used for instance for power distribution with offshore oil and gas fields. As an example, when providing electric power to remote subsea locations, a step-down transformer will be used for lowering the voltage delivered to an electric load such as an electric motor powering a pump or compressor.

Subsea transformers can also be used in power distribution systems that connect to remote power generation units, such as offshore wind turbines or PV power plants.

For offshore power plants, it is common to collect the power from clusters of wind turbines on offshore platforms. At such platforms, the collected power is converted to a form suitable for further transmission. Such further transmission can typically be to an onshore facility, where the produced power is fed into a power grid.

Furthermore, it is common to transmit the power as high voltage direct current (HVDC) power. An example of such a power transmission system is disclosed in publication EP2713468. Here, power produced from a plurality of wind turbines connect to a common busbar on an offshore converter platform. The platform is equipped with several transformers transmitting power from the busbar to a plurality of AC-DC converters. The DC side of the converters are linked together.

SUMMARY OF INVENTION

According to a first aspect of the present invention, there is provided a high voltage offshore power plant power distribution assembly. The assembly comprises, at a subsea location, two end transformers and one or more intermediate transformers. The respective end transformers and intermediate transformers comprise a housing, a transformer core and winding assembly comprising a plurality of sets of utility windings and a set of collection windings. The respective transformers further comprise a plurality of utility terminals connected to utility windings, wherein at least some of the utility terminals are connected to offshore power providers, such as for instance offshore wind turbines or floating PV plants (solar power plants). The respective transformers further comprise a collection line connected to the set of collection windings. According to the first aspect of the present invention, the respective end transformers and one or more intermediate transformers further comprise two collection terminals and a collection line branching located inside the housing, wherein the collection line branching connects the two collection terminals to the collection line.

In an embodiment, the collection lines of said end transformers and the one or more intermediate transformers can be interconnected with transformer collection cables.

The offshore power plant power distribution assembly can further comprise two transmission cables. Moreover, one of the collection terminals of respective end transformers can connect to one respective transmission cable. The transmission cables can for instance extend to shore, such as for connection to the grid. The transmission cables can also, for instance, extend to and connect to a power collector hub, a HVDC hub, or an offshore consumer.

In some embodiments, the offshore power providers can comprise at least an offshore wind turbine or a floating PV plant. Moreover, one or more of the utility terminals can connect to an offshore power consumer.

The one or more of said end transformers or one or more intermediate transformers can in some embodiments comprise, inside the housing, a collection switch arranged with one or both of the collection terminals.

Furthermore, one or more of said end transformers or one or more intermediate transformers may comprise, inside the housing, a utility switch arranged with one or more of the utility terminals.

According to a second aspect of the present invention, there is provided a high voltage subsea transformer comprising a housing having a housing wall, a transformer core and winding assembly comprising a plurality of sets of utility windings and a set of collection windings. It further comprises utility terminals connected to the utility windings and a collection line connected to the collection windings. According to the second aspect of the present invention, the subsea transformer further comprises, inside the housing, a collection line branching and two collection terminals, wherein the collection line branching connects the collection terminals to the collection line.

In some embodiments, the subsea transformer can further comprise a collection switch on one or two of the collection terminals. The collection switch can advantageously be arranged inside the housing, thus being protected from the external environment.

Furthermore, the subsea transformer can further comprise a utility switch on one or more of the utility terminals. The utility switch can advantageously be arranged inside the housing, thus being protected from the external environment.

The one or more of the utility terminals can connect to an offshore power provider and one or more of the utility terminals can connect to an offshore power consumer.

According to a third aspect of the present invention, there is provided a method of installing a chain of interconnected end transformers and one or more intermediate transformers on the seabed at a water depth of at least 50 meters. The respective end transformers and the one or more intermediate transformers comprise a housing and a transformer core and winding assembly inside the housing. The transformer core and winding assembly comprises a plurality of sets of utility windings connected to utility terminals, and a set of collection windings connected to a collection line. The method comprises
 a) landing two end transformers and one or more intermediate transformers on the seabed.

According to the third aspect of the present invention, the end transformers and one or more intermediate transformers comprise two collection terminals and a collection terminal branching that connects the collection line to the collection terminals, and two collection penetrators connecting the collection terminals inside the housing to the exterior of the housing. Furthermore, the one or more intermediate transformers, respectively, comprise two transformer collection cables connected to a respective collection terminal, and the end transformers comprise one transformer collection cable connected to one collection terminal.

The method according to the third aspect of the invention further comprises c) interconnecting two ends of two transformer collection cables of different end or intermediate transformers with a cable connector at the surface;
d) lowering the two ends of the transformer connection cables and the cable connector to the seabed;
e) repeating steps c) and d) until both end transformers and the one or more intermediate transformers are connected as a chain with said transformer collection cables.

The method can in some embodiments further comprise the following step performed before step c):
b) from a subsea position, retrieving one end or two ends of one or two transformer collection cables to surface;
wherein step e) includes repeating steps b) to d).

The method may in some embodiments further comprise
f) connecting one or two of the end transformers to shore, to an offshore power collector hub, to an offshore HVDC hub, or to an offshore power consumer, with one or two, respectively, transmission cables,
wherein the one or two transmission cables connect to a collection terminal of said end transformers. The one or two transmission cable(s) can typically be carried on a reel on a cable-laying vessel.

With the term high voltage is meant that the offshore power plant power distribution assembly distributes electric power having a voltage of at least 1 kV. It will typically also mean distribution of power having power ranges above 10 MW.

DETAILED DESCRIPTION OF THE INVENTION

While the present invention has been discussed in general terms above, a more detailed and non-limiting example of embodiment will be discussed in the following with reference to the drawings, in which FIG. 1 depicts a schematic overview of an embodiment of an offshore power plant power distribution assembly;

Figure 1:
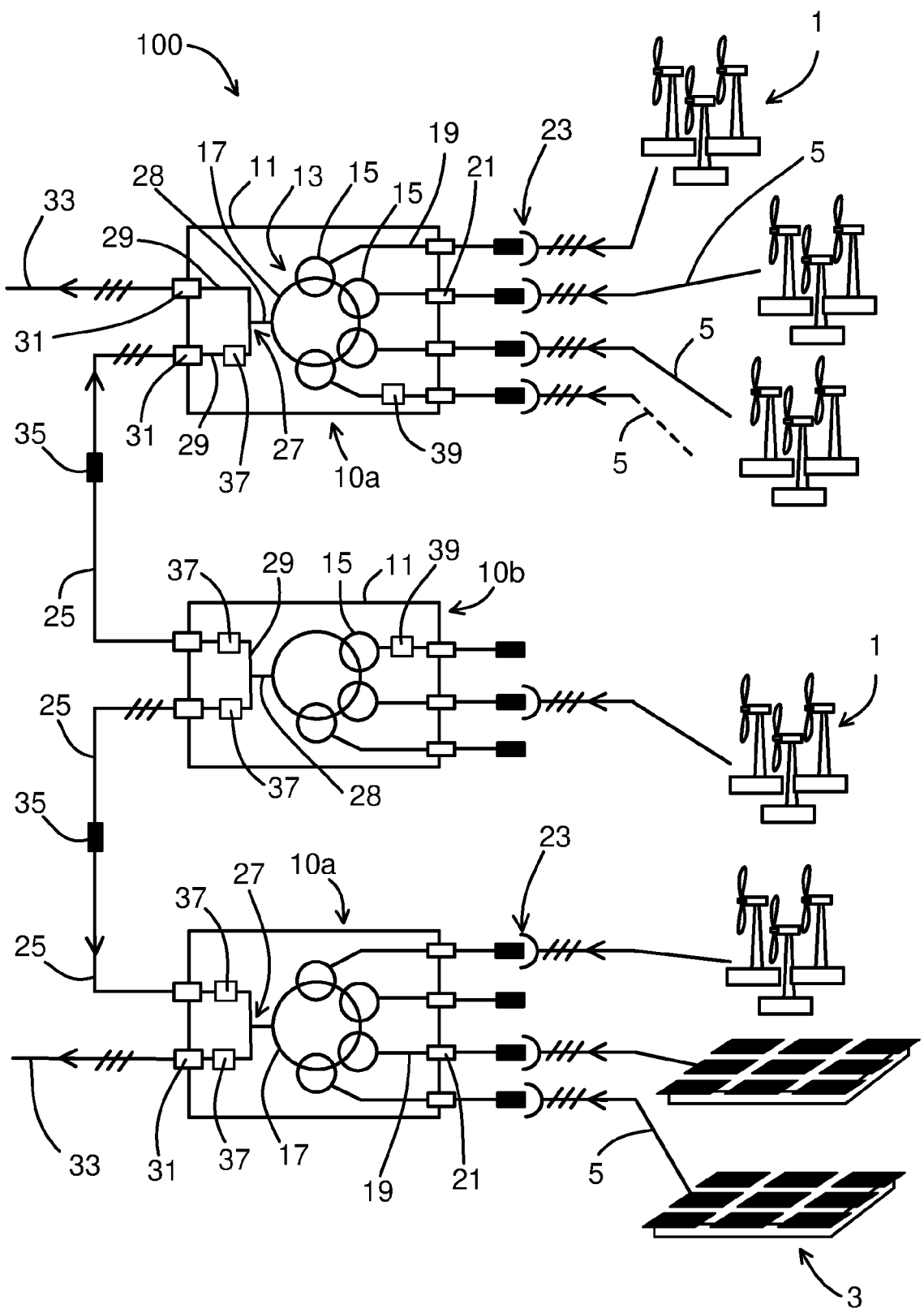

FIG. 1 is a schematic view of an offshore power plant power distribution assembly 100 according to the present invention. In the shown embodiment, the assembly 100 comprises three subsea transformers 10. The subsea transformers 10*a*, 10*b* have a housing 11 that constitutes a barrier between the surrounding water and the internal components of the transformer. The housing 11 is oil-filled.

The respective subsea transformers 10*a*, 10*b* comprise a transformer core and winding assembly 13. While the transformer core and winding assembly 13 is not really schematically shown in FIG. 1, the skilled person will appreciate that the shown windings, which are shown, are wound about the transformer core and winding assembly 13. The transformer core and winding assembly 13 has a plurality of sets of utility windings 15 and one set of collection windings 17. The shown transformer core and winding assembly 13 is a three-phase system. Thus, there will be several sets of utility windings 15 where each set comprises three windings, while there will be one set of three collection windings 17.

The skilled person will appreciate that while the terms collection windings and utility windings are used herein, alternative terms could be primary windings and secondary, tertiary windings, etc.

In the schematic illustration shown in FIG. 1, the uppermost subsea transformer 10*a* and the lower subsea transformer 10*a*, termed end transformers 10*a*, have four sets of utility windings 15 and one set of collection windings 17. The intermediate subsea transformer 10*b* comprises, in the present embodiment, only three sets of utility windings 15. The number will be chosen according to the specific embodiment.

The three subsea transformers 10*a*, 10*b* each connect to offshore power providers, here in the form of offshore wind turbines 1 and floating PV plants 3 (solar/photovoltaic power plants). The offshore power providers 1, 3 generate electric power that is delivered to the respective subsea transformers 10*a*, 10*b* through utility terminals 19. The utility terminals 19 connect to the utility windings 15 and connect to utility penetrators 21 arranged in the walls of the housing 11.

The utility terminals 19 connect to said offshore power providers 1, 3 via wet-mate connectors 23.

Power provider lines 5 connect the offshore power providers 1, 3 to the subsea transformers 10*a*, 10*b*, i.e. to the wet-mate connectors 23. It shall be understood that in some embodiments, all the utility terminals 19 could be connected, and in other embodiments fewer utility terminals 19 could be connected to the offshore power providers 1, 3. In FIG. 1, the dashed power provider line 5 connects to an offshore power provider 1, 3 which is not depicted in the drawing.

While the subsea transformers 10*a*, 10*b* in the schematic view of FIG. 1 are arranged systematically adjacent and close to each other, they will typically be arranged with more arbitrary configuration on the seabed.

Still referring to FIG. 1, the plurality of subsea transformers 10*a*, 10*b* are connected to each other in a serial configuration. Each subsea transformer 10*a*, 10*b* connects to at least one adjacent subsea transformer 10*a*, 10*b* through a transformer collection cable 25.

Inside the housing 11, the set of collection windings 17 connects to a collection line 28. The collection line 28 further connects to a collection line branching 27. The collection line branching 27 connects the collection windings 17 to two collection terminals 29.

In the embodiment shown in FIG. 1, where the offshore power plant power distribution assembly 100 comprises three subsea transformers 10*a*, 10*b*, one subsea transformer, namely the intermediate transformer 10*b*, connects to two end transformers 10*a* through the transformer collection cable 25. The transformer collection cables 25 connect to the collection terminals 29 through collection penetrators 31 in the wall of the housing 11.

In the other two transformers, namely the end transformers 10*a*, one collection terminal 29 connects to a transformer collection cable 25, while another collection terminal 29 connects to a transmission cable 33.

Thus, in the shown embodiment, the power generated by the offshore power providers 1, 3 is transmitted through the three subsea transformers 10*a*, 10*b*, and transmitted further to the two transmission cables 33. The transmission cables 33 extend along the seabed and can typically extend to shore for feeding the electric power to the grid. The transmission cables 33 can extend several tens or even some hundreds of kilometers along the seabed. The transmission cables 33 will transmit alternating current. It shall be understood that the electric power fed into the utility terminals 19 from the offshore power providers 1, 3 is synchronized alternating current. A 3-phase system is shown in FIG. 1.

While the embodiment shown in FIG. 1 comprises three subsea transformers 10a, 10b, it shall be clear that the offshore power plant power distribution assembly 100 may comprise more than three subsea transformers. In such embodiments, there will be two or more intermediate transformers 10b arranged in series between the two end transformers 10a that connect to the transmission cables 33.

Figure 2:
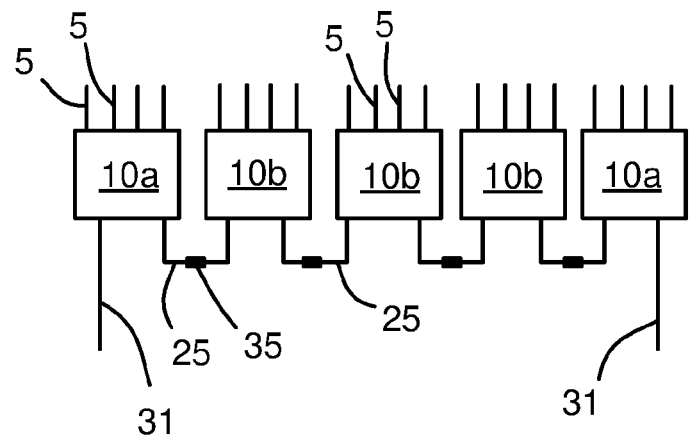
FIG. 2 is a schematic diagram showing how several subsea transformers are connected into a chain.

Hence, the plurality of subsea transformers 10a, 10b form a row or chain of transformers arranged in series, wherein the row comprises two end transformers 10a and one or more intermediate transformers 10b. FIG. 2 schematically depicts such a row of subsea transformers, including two end transformers 10a and three intermediate transformers 10b.

In FIG. 1, as indicated with the arrows on the transformer collection cables 25, power from the intermediate subsea transformer 10 flows towards both of the end transformers 10a. The direction of the power flow will depend, inter alia, on the power delivered to the respective subsea transformers 10a, 10b.

In some embodiments, such as the embodiment schematically shown in FIG. 1, the subsea transformers 10a, 10b connect to adjacent transformers through a pair of interconnected transformer collection cables 25. One transformer collection cable 25 extends from one respective subsea transformer 10a, 10b (namely from the collection penetrator 31), and connects to the other transformer collection cable 25 with a cable connector 35.

As will be discussed in further detail below, the cable connector 35, which connects the collection cables 25, can advantageously be connected at a dry location, such as on a ship, before being lowered down to the seabed. The cable connector 35 can for instance be a common cable splice.

Still referring to FIG. 1, the subsea transformer 10a, 10b can advantageously comprise a collection switch 37 arranged in one of or both of the collection terminals 29. If one subsea transformer 10a, 10b is malfunctioning, the operator can open the switch to disconnect the connection to the adjacent subsea transformer 10a, 10b. This can also be done if, for instance, one of the transmission cables 33 are out of service. As an example, if the lowermost transmission cable 33 depicted in FIG. 1 is damaged, the collection switch 37 shown in the lowermost end transformer 10a can be opened. Power will then be transmitted to the adjacent intermediate transformer 10b, and further to the opposite end transformer 10a, and finally to the uppermost transmission cable 33. This redundancy enables the operator to transmit power to shore while performing maintenance on one of the transmission cables 33.

The redundancy also permits maintenance of the subsea transformers, while still producing power. For instance, the intermediate transformer 10b shown in FIG. 1 can be disconnected and retrieved to surface while still transmitting power through the two end transformers 10a.

In some embodiments of the offshore power plant power distribution assembly 100, one or more of the subsea transformers 10a, 10b may also comprise a utility switch 39. The utility switches 39 are arranged in the utility terminal 19, such that the utility terminals 19 can be disconnected from the wet-mate connectors 23 by opening the utility switches 39. While only two utility switches 39 are depicted in FIG. 1, more or even all the utility terminals 19 may be provided with utility switches 39.

Notably, in the shown embodiment the utility switches 39 and/or the collection switches 37 are arranged inside the housing 11 of the subsea transformers 10a, 10b.

Figure 3:
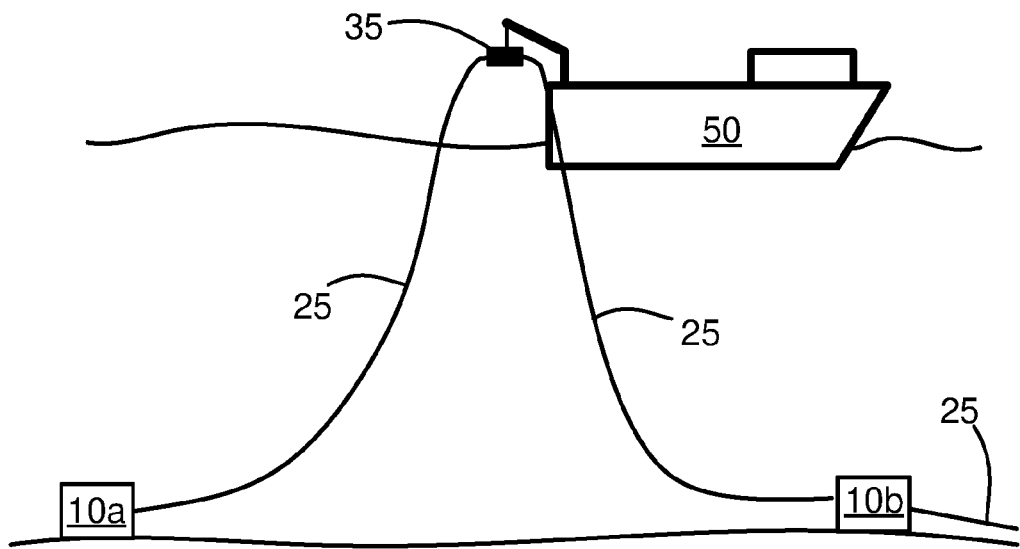
FIG. 3 illustrates how two subsea transformers are interconnected at a dry location while being installed subsea.

Reference is now made to FIG. 3, which depicts the process of connecting two subsea transformers 10a, 10b with a pair of transformer collection cables 25. When performing the connection, a ship 50 can retrieve the ends of the respective transformer collection cables 25 and connect them with the cable connector 35. Hence, the cable connector 35 is configured for being connected at a dry location and is configured to be submerged when in the connected state.

When the two transformer collection cables 25 have been connected, they are, together with the cable connector 35, lowered down to the seabed. It will be appreciated that to perform this operation, particularly at significant water depths, the length of the transformer collection cables 25 need to be significantly longer than the distance between the two subsea transformers 10a, 10b. In some embodiments, the water depth may be more than 300 meters, more than 1000 meters or even more than 1500 meters.

Once the two subsea transformers 10a, 10b shown in FIG. 3 are connected, the intermediate transformer 10b can be connected to a further subsea transformer 10a, 10b.

Figure 4:
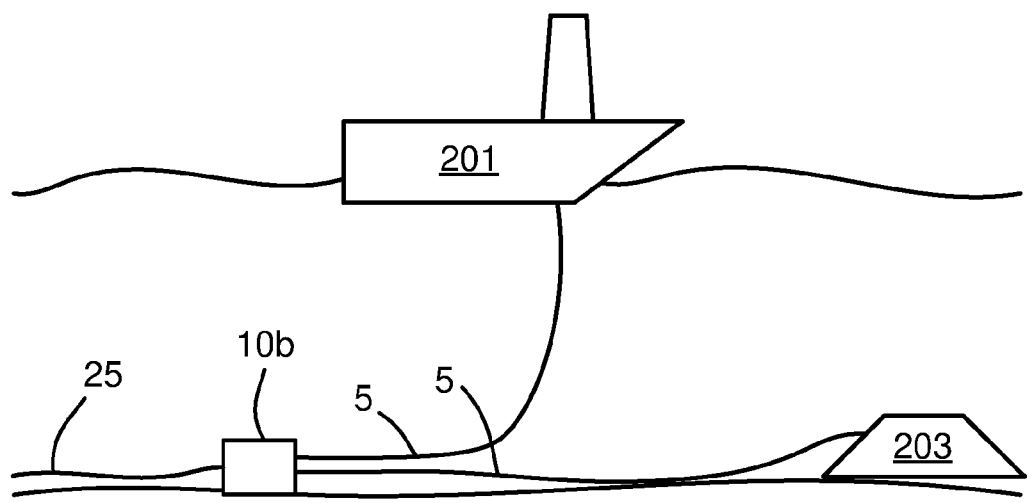
FIG. 4 depicts an embodiment wherein offshore power consumers are connected to the power distribution assembly.

FIG. 4 depicts an embodiment similar to the embodiment shown in FIG. 1. Only one subsea transformer 10a is shown, but it shall be understood that there are at least two further subsea transformers 10a, 10b arranged. In this embodiment, power flows out from the subsea transformer 10b to offshore power consumers.

In this embodiment, the offshore power consumers are represented by an FPSO 201 and a subsea pump arrangement 203. To make the embodiment of FIG. 4 fit with the embodiment shown in FIG. 1, one could for instance replace the two floating PV plants 3 of FIG. 1 with the FPSO 201 and the subsea pump arrangement 203 shown in FIG. 4.

Thus, the offshore power plant power distribution assembly 100 can be used not only to collect power from the offshore power providers 1, 3. It can further be used to supply power to the offshore power consumers 201, 203.

Moreover, in conditions where the offshore power providers 1, 3 are not producing sufficient power to power-supply the offshore power consumers 201, 203, power can be supplied from shore through the transmission cables 33.

The invention claimed is:

1. A high voltage offshore power plant power distribution assembly comprising:
    two end transformers and one or more intermediate transformers, wherein the respective end transformers and intermediate transformers comprise
    a housing;
    a transformer core and winding assembly comprising a plurality of sets of utility windings and a set of collection windings;
    a plurality of utility terminals connected to utility windings, wherein at least some of the utility terminals are connected to offshore power providers; and
    a collection line connected to the set of collection windings;
    wherein the respective end transformers and one or more intermediate transformers further comprise:
    two collection terminals; and
    a collection line branching located inside the housing; and
    wherein the collection line branching connects the two collection terminals to the collection line.

2. The offshore power plant power distribution assembly according to claim 1, wherein the collection lines of said end transformers and the one or more intermediate transformers are interconnected with transformer collection cables.

3. The offshore power plant power distribution assembly according to claim 1, further comprising two transmission cables and wherein one of the collection terminals of respective end transformers connects to one respective transmission cable.

4. The offshore power plant power distribution assembly according to claim 1, wherein the offshore power providers comprises at least an offshore wind turbine or a floating PV plant, and wherein one or more of said utility terminals connect to an offshore power consumer.

5. The offshore power plant power distribution assembly according to claim 1, wherein one or more of said end transformers or one or more intermediate transformers comprises, inside the housing, a collection switch arranged with one or both of the collection terminals.

6. The offshore power plant power distribution assembly according to claim 1, wherein one or more of said end transformers or one or more intermediate transformers comprises, inside the housing, a utility switch arranged with one or more of the utility terminals.

7. A high voltage subsea transformer comprising:
a housing having a housing wall,
a transformer core and winding assembly comprising a plurality of sets of utility windings and a set of collection windings,
utility terminals connected to the utility windings and a collection line connected to the collection windings,
inside the housing, a collection line branching and two collection terminals, wherein the collection line branching connects the collection terminals to the collection line.

8. The subsea transformer according to claim 7, comprising a collection switch on one or two of the collection terminals.

9. The subsea transformer according to claim 7, comprising a utility switch on one or more of the utility terminals.

10. The subsea transformer according to claim 7, wherein one or more of the utility terminals connect to an offshore power provider and one or more of the utility terminals connects to an offshore power consumer.

11. A method of installing a chain of interconnected end transformers and one or more intermediate transformers on the seabed at a water depth of at least 50 meters, wherein the respective end transformers and the one or more intermediate transformers comprise a housing and a transformer core and winding assembly inside the housing, wherein the transformer core and winding assembly comprises:
a plurality of sets of utility windings connected to utility terminals; and
a set of collection windings connected to a collection line;
the method comprising:
a) landing two end transformers and one or more intermediate transformers on the seabed;
wherein the end transformers and one or more intermediate transformers comprise:
two collection terminals and a collection terminal branching that connects the collection line to the collection terminals,
two collection penetrators connecting the collection terminals inside the housing to the exterior of the housing; and
the one or more intermediate transformers, respectively, comprise two transformer collection cables connected to a respective collection terminal, and the end transformers comprise one transformer collection cable connected to one collection terminal;
c) interconnecting two ends of two transformer collection cables of different end or intermediate transformers with a cable connector at the surface;
d) lowering the two ends of the transformer connection cables and the cable connector to the seabed;
e) repeating steps c) and d) until both end transformers and the one or more intermediate transformers are connected as a chain with said transformer collection cables.

12. The method according to claim 11, comprising the following step performed before step c):
b) from a subsea position, retrieving one end or two ends of one or two transformer collection cables to surface; and
wherein step e) includes repeating steps b) to d).

13. The method according to claim 11, comprising:
f) connecting one or two of the end transformers to shore, an offshore power collector hub, an offshore HVDC hub, or an offshore power consumer, with one or two, respectively, transmission cables; and
wherein the one or two transmission cables connects to a collection terminal of said end transformers.

* * * * *